United States Patent [19]

Takashima et al.

[11] Patent Number: 5,588,544
[45] Date of Patent: Dec. 31, 1996

[54] BOTTLE NECK STRUCTURE AND A MANUFACTURING METHOD THEREFOR

[75] Inventors: Tadayoshi Takashima, Kobe; Takahiro Chiba, Kawagoe; Takashi Tanaka, Kobe, all of Japan

[73] Assignee: Yamamura Glass Co., Ltd., Hyogo-ken, Japan

[21] Appl. No.: 925,584

[22] Filed: Aug. 3, 1992

Related U.S. Application Data

[63] Continuation of Ser. No. 560,600, Jul. 13, 1990, abandoned.

[30] Foreign Application Priority Data

Jul. 31, 1989 [JP] Japan .................................. 1-199989
Dec. 31, 1989 [JP] Japan .................................. 1-344814

[51] Int. Cl.⁶ .................................................. B65D 1/02
[52] U.S. Cl. .............................................. 215/42; 215/12.2
[58] Field of Search ........................... 215/1 C, 31, 12.2, 215/42, 40

[56] References Cited

U.S. PATENT DOCUMENTS

| | | | |
|---|---|---|---|
| 657,067 | 8/1900 | Houghton | 215/31 X |
| 3,744,656 | 7/1973 | Wolfram | 215/1 C X |
| 3,899,096 | 8/1975 | Marco | 215/31 |
| 3,899,278 | 8/1975 | Fead et al. | 215/31 X |
| 4,341,317 | 7/1982 | Suzuki et al. | 215/31 |
| 4,342,799 | 8/1982 | Schwochert | 428/35 |
| 4,386,046 | 5/1983 | Yoshino et al. | 215/1 C X |
| 4,715,504 | 12/1987 | Chang et al. | 215/1 C |
| 4,988,472 | 1/1991 | Orimoto et al. | 264/273 |

FOREIGN PATENT DOCUMENTS

| | | | |
|---|---|---|---|
| 144450 | 6/1985 | European Pat. Off. | 215/1 C |
| 229260 | 7/1987 | European Pat. Off. | 215/1 C |
| 303718 | 2/1989 | European Pat. Off. . | |
| 415109 | 3/1991 | European Pat. Off. | 215/31 |
| 1319686 | 1/1963 | France | 215/1 C |
| 54-68385 | 6/1979 | Japan . | |
| 54-72180 | 6/1979 | Japan . | |
| 55-89056 | 7/1980 | Japan . | |
| 58-149242 | 9/1983 | Japan . | |
| 59-33101 | 8/1984 | Japan . | |
| 61-35056 | 8/1986 | Japan . | |
| 61-259946 | 11/1986 | Japan . | |
| 62-299506 | 6/1987 | Japan . | |
| 63-307054 | 12/1988 | Japan . | |
| 63-194116 | 12/1988 | Japan . | |
| 63-194115 | 12/1988 | Japan . | |
| 1118420 | 5/1989 | Japan . | |
| 1125545 | 5/1989 | Japan . | |
| 379903 | 9/1932 | United Kingdom | 215/31 |
| 992750 | 4/1962 | United Kingdom . | |

*Primary Examiner*—Sue A. Weaver
*Attorney, Agent, or Firm*—Morrison Law Firm

[57] ABSTRACT

A bottle neck structure of a synthetic resin bottle preform with a preliminarily molded synthetic resin core member embedded therein is disclosed. The resin core member has a cylindrical body, that extends the length of the wall of a bottle neck, and a flange constituting a support ring of the bottle neck. At least one external surface of the resin core member is exposed to be in contact with a mold when a bottle preform is molded. The cylindrical body has a plurality of through-holes formed in its circumferential wall to allow bottle resin to flow through and form a contiguous external and internal layer. The preform is subsequently subjected to a biaxial blow-stretch manufacturing process resulting in a finished synthetic resin bottle with a neck of the present invention.

27 Claims, 17 Drawing Sheets

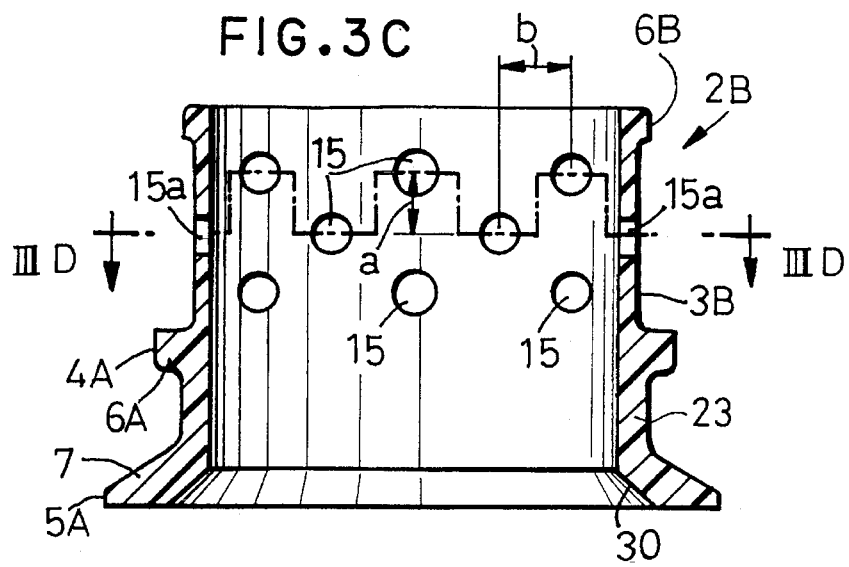
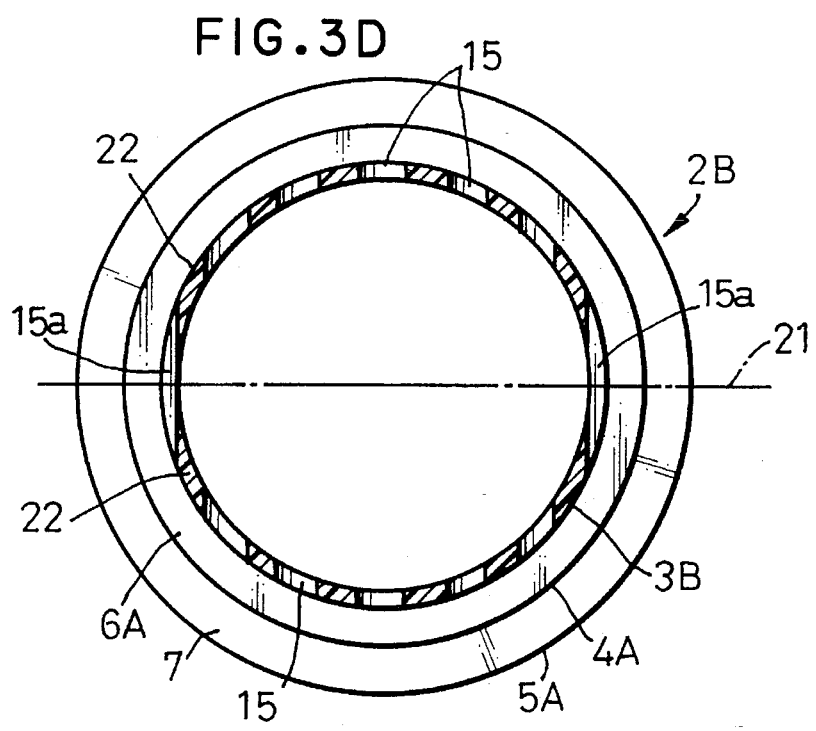
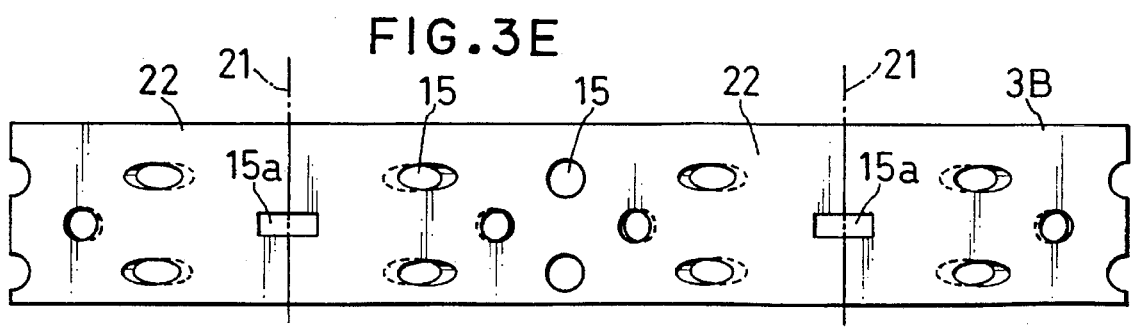

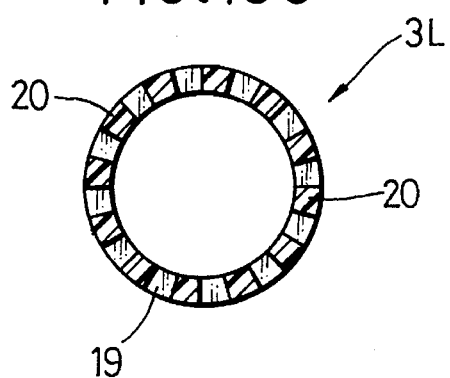
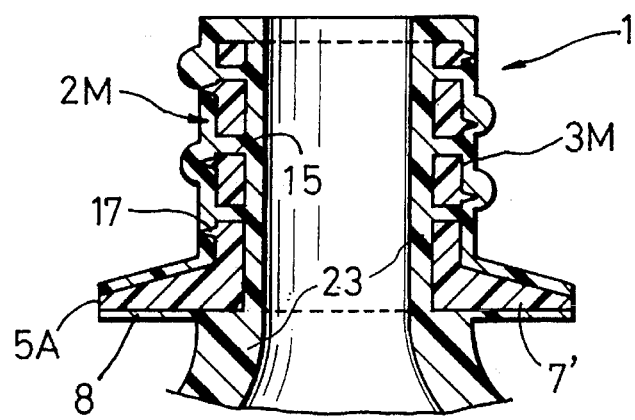
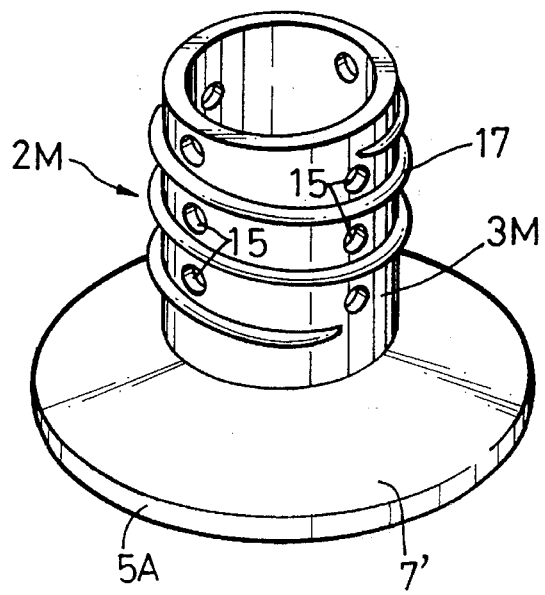

BOTTLE NECK STRUCTURE AND A MANUFACTURING METHOD THEREFOR

This is a continuation of application Ser. No. 07/560,600 filed on Jul. 31, 1990, abandoned.

BACKGROUND OF THE INVENTION

The present invention relates to an improved neck structure of synthetic resin bottles.

Synthetic resin bottles are coming into increasing use in recent years. Particularly, polyethyleneterephthalate (PET) bottles, produced by biaxially blow-stretching a preform, are widely used due to their transparency, gas-barrier performance and strength.

However, PET bottles have a problem in thermal resistance. That is, they deform when filled with hot liquid such as juice after high temperature sterilization or when they are exposed to a hot shower or are immersed in a hot bath for sterilization after filling with, for example, carbonated natural juice.

Conventionally, to avoid this problem, biaxially stretched bottle drum bodies are heat set (Japanese Laid-Open Utility Model Publication No. SHO63-194115) or multiple-layered with a thermally resistant resin (Japanese Laid-Open Patent Publication No. SHO63-307054 and Japanese Laid-Open Utility Model Publication No. SHO63-194116).

The bottom of the bottle, which is hard to stretch, is treated for crystallization and blushing or is multiple-layered with a thermally resistant resin, thereby providing thermal resistance and rigidity.

The bottle neck is not stretched biaxially. The bottle neck is treated for thermal resistance using, for example, one of the following methods:

According to the inventions disclosed in Japanese Patent Publications Nos. SHO61-35056, SHO59-33101 and SHO54-68385, the bottle neck is provided with thermal resistance by thermal treatment for crystallization and blushing.

According to the inventions disclosed in Japanese Laid-Open Patent Publication No. SHO63-307054, Japanese Laid-Open Utility Model Publication No. SHO63-194115 and Japanese Laid-Open Patent Publication No. 61-259946, when a bottle preform is molded, thermal resistant resin and PET resin are co-injected to form a multiple-layer bottle neck, thereby providing thermal resistance to the bottle neck.

According to the invention disclosed in Japanese Laid-Open Patent Publication No. SHO58-149242, a bottle preform is molded in two steps: in the first step, a threaded outer cylindrical piece for a bottle neck is molded with a thermally resistant resin, and then the inner neck layer integral with the threaded cylindrical piece and the bottle drum body are injection-molded with bottle resin material, using the threaded cylindrical piece as a part of a neck mold. In this manner, a bore and bottle drum body are integrally formed with each other and with the threaded cylindrical piece.

According to the inventions disclosed in Japanese Laid-Open Patent Publications Nos. SHO54-72180 and SHO55-89056, a thermally resistant resin insert piece is molded in advance. A bottle neck is molded with bottle resin material surrounding the insert piece when the bottle preform is molded.

According to the inventions disclosed in Japanese Laid-Open Patent Publications Nos. HEI 1-124545 and HEI 1-118420, a thermally resistant resin core member, comprising a cylindrical body constituting the wall of a bottle neck and a flange constituting a support ring is molded in advance. The resin core member is set in the mold at the position for the bottle neck. The resin core member is embedded in bottle resin material so that the cylindrical body and the flange are sandwiched between bottle resin material layers when a bottle preform is molded. In this way, the resin core member provides thermal resistance to the bottle neck including the support ring.

According to the prior art disclosed in Laid-Open Patent Publication No. HEI 1-124545, a preform mold includes pins slidably projecting from and retracting into the mold. When a bottle preform is molded, the pins are projected to hold the resin core member within the mold.

According to the disclosure in Laid-Open Patent Publication No. HEI 1-118420, the resin core member includes a spacer projecting therefrom. The spacer is clamped in the mold to hold the resin core member in place before a bottle preform is molded.

According to the two foregoing inventions, bottle resin material flows on the inner surface the cylindrical body of the resin core member and is fed to the outer circumferential surface of the cylindrical body through holes formed positioned where the flange projects from the cylindrical body.

Conventional techniques for providing thermal resistance to a synthetic resin bottle, particularly to the bottle neck, as mentioned above, have a number of disadvantages as follows.

The disadvantages of the art disclosed in the Japanese Patent Publication No. SHO61-35056 and others in which the bottle neck is crystallized and blushed by thermal treatment include the following: The number of manufacturing processes is increased due to the thermal treatment process. The crystallized portions are brittle and exhibit degraded impact strength. The dimensional stability is degraded due to contraction. And the crystallized portions are not transparent.

The disadvantages of the art disclosed in Japanese Laid-Open Patent Publication No. SHO63-307054, and others that use co-injection of thermally resistant resin and PET resin to mold a bottle preform having a bottle neck with a two-layered structure, have the following disadvantages:

Due to the differences of the two resins in glass transition point, melting point and viscosity at a particular molding temperature, it is extremely difficult to control the flow rate of the two co-injected resin materials in the boundary of the two resin layers and to ensure appropriate resin flow to appropriate areas.

The disadvantages of the art disclosed in the Japanese Laid-Open Patent Publication No. SHO58-149242 in which a threaded outer piece for a bottle neck is formed separately, and of the art disclosed in the Japanese Laid Open Patent Publication No. SHO54-72180 in which a insert piece for a bottle neck is surrounded by thermally resistant resin, are as follows:

The piece may become separated from the bottle resin material due to the difference in thermal expansion between the piece and bottle resin materials. If the piece is joined firmly with the bottle resin material, the bottle neck may be cracked by the differential thermal expansion. Specifically, according to this prior art, the piece is joined to the bottle resin material only at the inner or outer side. Therefore, if hot liquid is poured into the bottle, the bottle resin may be separated from the piece due to the difference in thermal expansion between the piece and bottle resin materials.

The bottle neck obtained by the invention disclosed in the Japanese Laid-Open Patent Publication No. HEI 1-118420, in which a thermally resistant resin core member comprising a cylindrical body and a flange is embedded in the bottle resin material, has solved most of the problems of the above prior art. However, since the bottle resin material is led from inside to outside the cylindrical body through the holes positioned where the flange projects from the cylindrical body, the resin material outside the cylindrical body flows at a different rate from that inside the cylindrical body. As a result, differential pressure is produced between the outer and inner resin layers of the bottle neck. The differential pressure together with the heat of the bottle resin material itself causes the insert piece to be distorted, bent or deformed.

OBJECT AND SUMMARY OF THE INVENTION

It is an object of the present invention to provide an improved bottle neck structure of a synthetic resin bottle, which has improved thermal resistance and is free from the above-mentioned problems of the prior art.

The present invention provides a bottle neck structure with a preliminarily formed synthetic resin core member embedded therein. The resin core member comprises a cylindrical body constituting the wall of a bottle neck, a flange constituting the support ring of the bottle neck, at least one exposed surface portion to be in contact with a neck mold when a bottle preform is molded, and a plurality of through-holes formed in the circumferential wall of the cylindrical body.

The cylindrical body of the resin core member is preferably a plate, meaning a tube formed of an encircling sheet of material, having a plurality of through-holes therein. Alternatively, it may be a column train, mesh or lattice.

In these alternative cases, the openings in the column train, mesh or lattice serve as the through-holes.

To ensure a uniform pressure in the inner and outer layers of the resin core member, the configuration of the resin core member and the arrangement of the through-holes in the wall of the cylindrical body must be selected so that the resin for the bottle is allowed to flow at as uniform a rate as possible from inside to outside the resin core member.

Specifically, for a plate cylindrical body having through-holes formed in the plate, the diameter of each through-hole is preferably 1 mm or more to ensure smooth flow of bottle resin material and to ensure a uniform pressure in the inner and outer resin layers of the cylindrical body.

For smooth flow of bottle resin material, it is preferable that the downward-facing inside edge of the cylindrical body of the resin core member be chamfered. More specifically, the downward-facing inside edge is preferably rounded to have a radius of at least 0.5 mm, or is tapered upward so that the inside radius of the cylindrical body, measured at the taper starting edge is at least 0.5 mm larger than the inside radius measured at the taper end edge.

To minimize the amount of resin required to form a bottle, a step may be formed in the inner wall of the cylindrical body. In this case, it is also preferable to chamfer the step edge in the same way as described above for the downward-facing inside edge.

When a bottle preform is formed, bottle resin material flows on the inner surface of the resin core member. To ensure smooth resin and a uniform flow rate of the bottle resin material from inside to outside the resin core member through the through-holes, the resin passage width inside the resin core member, that is, the gap between the inner surface of the resin core member and the core mold is preferably at least 0.5 mm.

The through-holes should be spaced apart substantially uniformly in the circumferential direction and should be oriented toward the center of the resin core member. However, when the resin core member is injection molded in a split mold, the need for through-holes requires a complicated, and expensive, split mold. Therefore, the through-holes are preferably arranged and oriented in the following manner to ensure uniform distribution of bottle resin material in the outer layer of the cylindrical body.

First, supposing the cylindrical body of the resin core member is divided by a hypothetical partition into equal hypothetical segments, it is preferable that the total open area of the through-holes in each hypothetical segment be substantially the same.

Secondly, the arrangement of the through-holes in each hypothetical segment is preferably symmetrical with respect to the hypothetical partition.

Finally, it is preferable that the through-holes be spaced apart substantially uniformly in both vertical and circumferential directions and that the open area of all through-holes be substantially equal. Further, like a mesh or lattice, the distance between any two vertically adjacent through-holes is preferably the same as that between any two circumferentially adjacent through-holes. In the area of the hypothetical partition, it is often difficult to arrange through-holes with uniform open areas at uniform intervals. Therefore, it may not be possible to form through-holes in this area. If they are formed, the diameters and intervals thereof may be somewhat different from the diameters and intervals of through-holes in other areas. In this text of the specification, however, the diameters and intervals of the through-holes in the vicinity of the hypothetical partition are considered to be the same as the diameters and intervals of the through-holes in other area, even if, in fact, they are somewhat different.

In one example, through-holes may be oriented parallel to the line connecting the center of each hypothetical segment arc with the center of the resin core member, or oriented toward the center of the resin core member.

The resin core member has at least one exposed surface portion for contacting the neck mold for a preform. When a preform is molded, this exposed surface portion contacts the neck mold, thus retaining the resin core member in a specified place.

A flange is formed at the lower circumference of the resin core member as a part of the support ring, thereby providing thermal resistance to the support ring. Due to this thermal resistance, a bottle can be held stably by the support ring while hot liquid is poured into the bottle or while the bottle cap is tightened.

If the top or bottom face of the flange is in contact with the neck mold, the resin core member is held more stably in the mold.

If a radial outward projection is formed immediately above the flange, and an outer surface between the peripheral end surface of the projection and the peripheral end surface of the flange is exposed, so as to be in contact with the neck mold when a bottle preform is molded, the mold can hold the resin core member more stably.

Normally, most of the cylindrical body of the resin core member is embedded in the bottle resin material to form a three-layered bottle neck. Alternatively, the outer surface of the cylindrical body may be exposed with only threads formed of bottle resin material on the outer surface. In such a case, the bottle resin material flows through the through holes from inside to outside the cylindrical body to form the threads. In this text of the specification, even if the outer cylindrical body surface, except for the surface portion for threads, is exposed, the resin core member is considered to be embedded in the bottle neck.

The top end surface of the cylindrical body of the resin core member may be exposed to permit contact with the neck mold. In such a case, however, the boundary lines between the bottle resin layer and the resin core member may be visible, even if not clearly. To hide these lines, the entire top surface of the cylindrical body may be covered with bottle resin material, or the top end portion of the cylindrical body may be extended horizontally in both outward and inward directions so as to constitute the entire top end surface of the bottle neck.

Alternatively, spiral, vertical or horizontal ridges may be formed on the resin core member to serve as the contact surface with the neck mold.

Any resin material may be used for the bottle, although PET resin is preferred.

To provide thermal resistance to the bottle neck, the resin core member is preferably made of thermally resistant resin. Specifically, when PET resin is used for the bottle, the resin core member is preferably made of "U-Polymer" (U-8400 made by Unitika Ltd.) obtained by dehydrogenation polymerization of phthalic acid, ethylene glycol and bisphenol A, polyarylate resin, polyamide resin (including amorphous type), polycarbonate resin, polyimide resin, polysulfone resin, polyethylenenaphthalate resin or the like resin whose thermal resistance is higher than that of PET resin.

"U-Polymer" has a particularly high adhesion property. Therefore, if the resin core member is made of "U-Polymer", the resin core member is bonded firmly with the bottle resin even when the bottle neck has a two-layered structure with the top or bottom face of the flange exposed, or when the outer cylindrical body surface is exposed with threads formed of bottle resin material around the exposed cylindrical body surface.

Together with, or instead of, the thermally resistant resin, a reversible or irreversible pigment (for instance, a pigment whose color varies with temperature) and/or a bacteriostat may be added to the resin of the resin core member. The resin of the resin core member may be colored, carved and/or provided with surface-printing.

The bottle drum body and bottom may have various structures according to the purpose. For instance, if the bottle is to be used for retorted food, the bottle drum body may be heat-set or multiple-layered with a thermally resistant resin layer to provide thermal resistance. If the bottle is to be used for a carbonated drink, the bottle drum body may be multiple-layered with a gas barrier resin layer which blocks the transmission of carbon dioxide gas, and the like. To provide thermal resistance and pressure resistance, the bottle drum body may be heat set and the bottom may be multiple-layered with a gas barrier resin or thermally resistant resin layer.

A synthetic resin bottle having the bottle neck structure of the present invention is manufactured using the following method.

First, a preliminarily molded synthetic resin core member is set in the neck mold for a preform. The resin core member comprises a cylindrical body having a plurality of through-holes in the circumferential wall thereof and constituting the wall of a bottle neck, a flange constituting the support ring of the bottle neck, and at least one surface portion to-be contacting the neck mold to retain the resin core member stably within the mold when the mold is clamped. The neck mold is clamped to hold the resin core member set therein, and a cavity mold is installed. Bottle resin material is introduced into a cavity between the drum body mold and a core mold by injection to mold a preform drum body. Alternatively, a certain quantity of bottle resin may be extruded into a cavity and compressed by a core mold to mold a preform drum body. The bottle resin material is allowed to flow from inside to outside the cylindrical body through the through-holes to form a bottle neck. A synthetic resin bottle preform is thus completed.

The preform thus manufactured is blown to be biaxially-stretched so as to form a synthetic resin bottle.

The bottle neck structure according to the present invention comprises a preliminarily molded synthetic resin core member embedded in the bottle resin material, the resin core member including a cylindrical body which constitutes the wall of the bottle neck and a flange which constitutes the support ring of the bottle neck. Therefore, the bottle neck of the present invention is provided with various properties simply by selecting appropriate resin material for the resin core member. For instance, the bottle neck will provide thermal resistance if thermally resistant resin is selected as the resin core member material.

Since the resin core member is molded before it is set in the neck mold and embedded in the bottle neck, thermal treatment is not necessary. Also, it is easy to set the resin core member in a proper position in the bottle neck. In addition, since a bottle preform with the resin core member embedded in the bottle neck is blown to be biaxially stretched to form a bottle, a high adhesion force is obtained between the cylindrical body of the resin core member and the bottle resin.

If the cylindrical body is a plate type, with a plurality of through-holes formed in the circumferential wall thereof, bottle resin material is allowed to flow through the holes from inside to outside the resin core member, with the bottle resin material filling the through-holes serving as a bridge connecting the inner and outer layers across the resin core member. Consequently, the bonding strength between the bottle resin material and the resin core member is reinforced.

If the downward-facing inside edge (or edges) of the cylindrical body is rounded to have a radius of 0.5 mm or more, or chamfered to be tapered upward so that the inside radius of the cylindrical body measured at the start of the taper is 0.5 mm or more larger than that measured at the end of the taper, bottle resin material flows smoothly.

According to the present invention, through-holes of 1 mm or larger diameter are formed in the wall of the cylindrical body, allowing bottle resin material to flow through. The thickness of the cylindrical body wall is set to permit a 0.5 mm or wider gap or passage for bottle resin material between the inner surface of the cylindrical body and the core mold. The through-holes are formed in the resin core member such that, when the resin core member is divided by a hypothetical partition into equal hypothetical segments, the total open area of the through-holes in one hypothetical segment is the same as that in the other segment. This distributes bottle resin material at a uniform rate from inside to outside the cylindrical body, thus preventing the resin core member from being distorted, bent or deformed.

According to the present invention, if the bottle drum body and/or the bottom are heat-set or multiple-layered with a thermal resistant or gas barrier resin layer, it is possible to realize a high thermal resistant and/or high pressure resistant bottle suitable as a container for retorted food, soda water and carbonated natural juice.

BRIEF DESCRIPTION OF THE DRAWINGS

FIG. 1A is a sectional view of a bottle.

FIG. 1B is a perspective view of a resin core member.

FIG. 1C is a longitudinal sectional view of the resin core member

FIG. 1D is a sectional view of the resin core member along the ID—ID line in FIG. 1C.

FIG. 1E is a developed view of the cylindrical body of the resin core member.

FIGS. 3A through 3E shows a bottle neck structure according to a second embodiment of the invention:

FIG. 3A is a sectional view of a bottle.

FIG. 3B is a perspective view of a resin core member.

FIG. 3C is a longitudinal sectional view of the resin core member of FIG. 3B.

FIG. 3D is a sectional view of the resin core member taken along the line IIID—IIID in FIG. 3C.

FIG. 3E is a developed view of the cylinder body of the resin core member.

FIG. 4A is a longitudinal sectional view of the resin core member.

FIG. 4B is a sectional view of the resin core member along IVB—IVB in FIG. 4A.

FIG. 4C is a developed view of cylindrical body of the resin core member.

FIG. 5A is a longitudinal sectional view of the resin core member.

FIG. 5B is a horizontal sectional view of the resin core member along VB—VB in FIG. 5A.

FIG. 5C is a developed view of the cylindrical body of the resin core member.

FIG. 6A is a longitudinal sectional view of the resin core member.

FIG. 6B is a sectional view of the core along VIB—VIB in FIG. 6A.

FIG. 6C is a developed view of the cylindrical body of the resin core member.

FIG. 11A is a sectional view of the bottle.

FIG. 11B is a perspective view of the resin core member.

FIG. 12A is a sectional view of the bottle neck structure.

FIG. 12B is a perspective view of the resin core member.

FIGS. 13A through 13C show a bottle neck structure according to a twelfth embodiment of the invention:

FIG. 13A is a sectional view of the bottle neck structure.

FIG. 13B is a perspective view of the resin core member.

FIG. 13C is a horizontal sectional view of the resin core member along XIIIC—XIIIC in FIG. 13B.

FIGS. 14A and 14B show a bottle neck structure according to a thirteenth embodiment of the invention:

FIG. 14A is a sectional view of the bottle neck structure.

FIG. 14B is a perspective view of the resin core member of the bottle neck structure of FIG. 14A.

DETAILED DESCRIPTION OF THE PREFERRED EMBODIMENTS

Figure 1A:
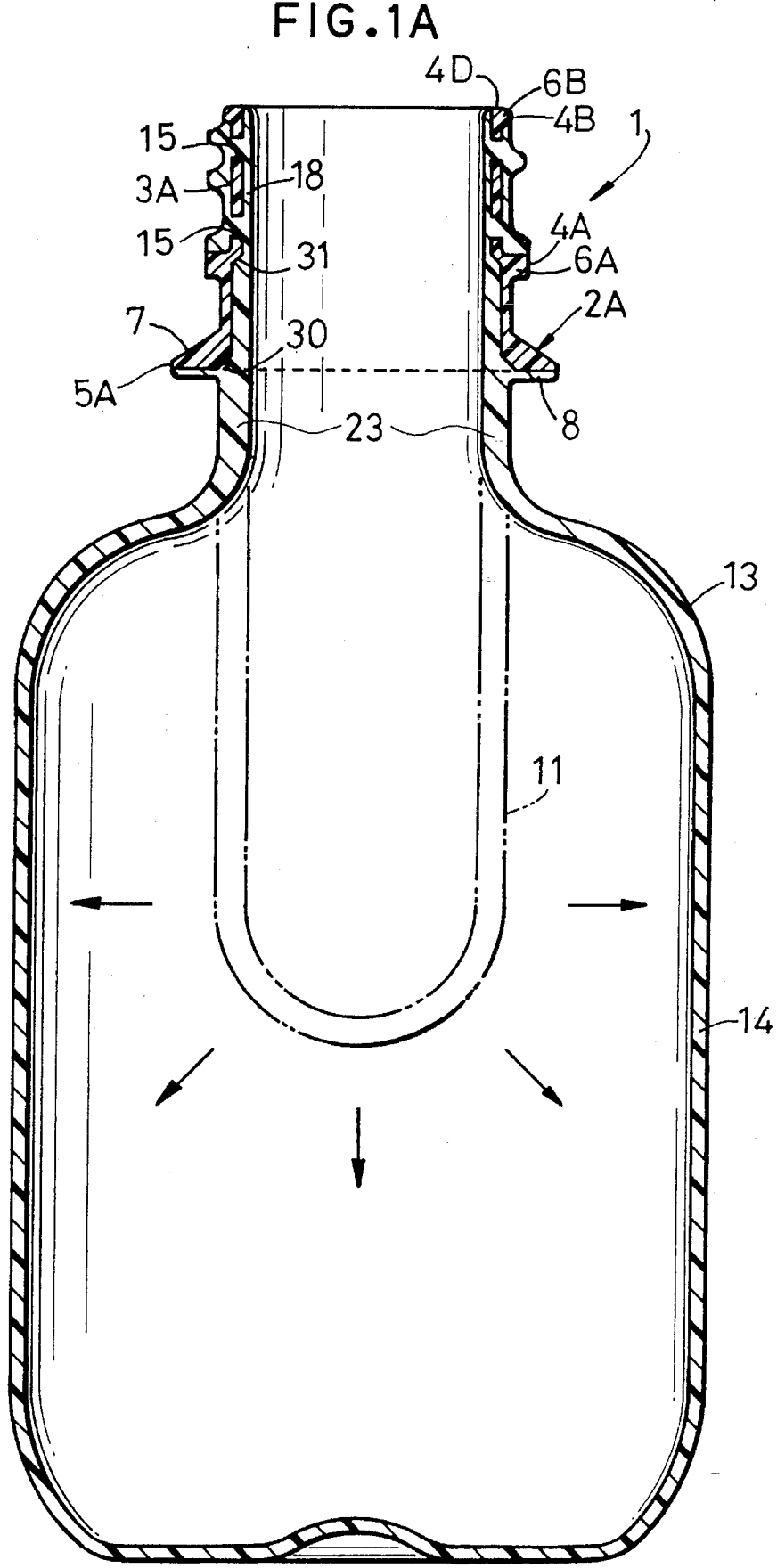
FIGS. 1A through 1E shows a bottle neck structure according to a first embodiment of the present invention.
Figure 1B:
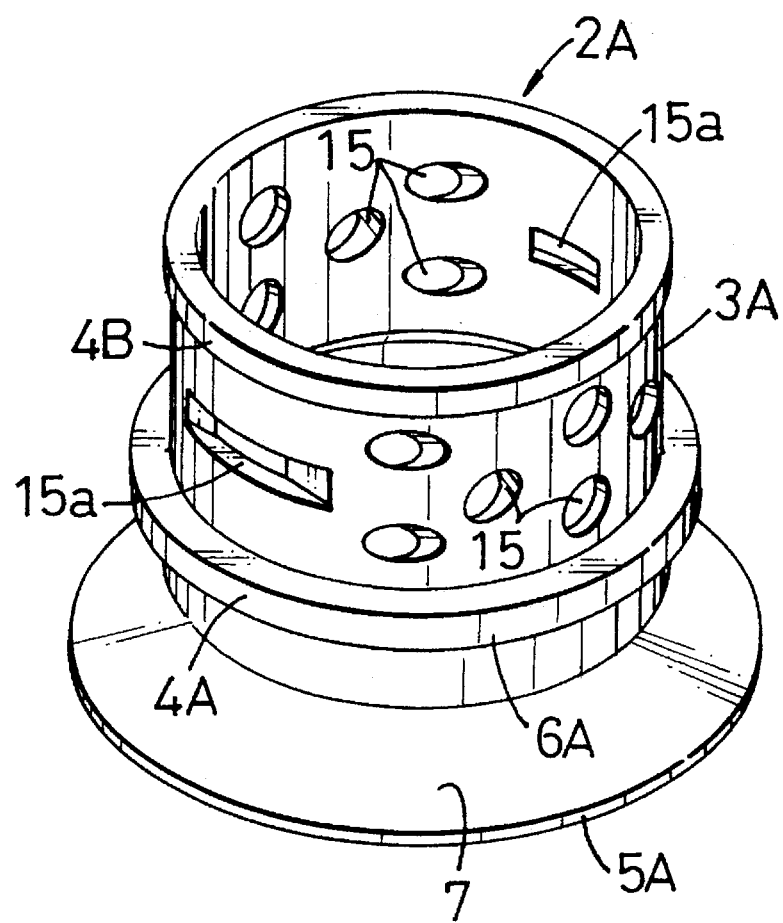

The present invention will be described further in detail with reference to the first through thirteenth embodiments and the attached drawings FIGS. 1 through 14.

Referring to FIGS. 1A through 1E, a bottle neck structure 1 of a first embodiment of the present invention includes a resin core member 2A having a cylindrical body 3A and a flange 7 sandwiched between bottle resin 23 material layers in such a manner that a majority portion of the cylindrical body 3A is embedded in bottle resin 23.

Through-holes 15 are formed in the cylindrical wall of the cylindrical body 3A, permitting bottle resin 23 material to pass through. Bottle resin 23 material passing through the holes 15, sandwiches the resin core member 2A on both sides and fills up the through-holes 15 to form bridges connecting the inner and outer bottle resin 23 layers, thereby fixing the resin core member 2A firmly and stably in the bottle neck structure 1.

The through-holes 15 in the resin core member 2A are arranged and oriented so that bottle resin 23 material may flow as uniformly as possible from inside to outside the cylindrical body 3A. The diameter of each through-hole 15 is at least 1 mm to permit smooth flow of bottle resin 23 material therethrough during molding with bottle resin 23.

Figure 1C:
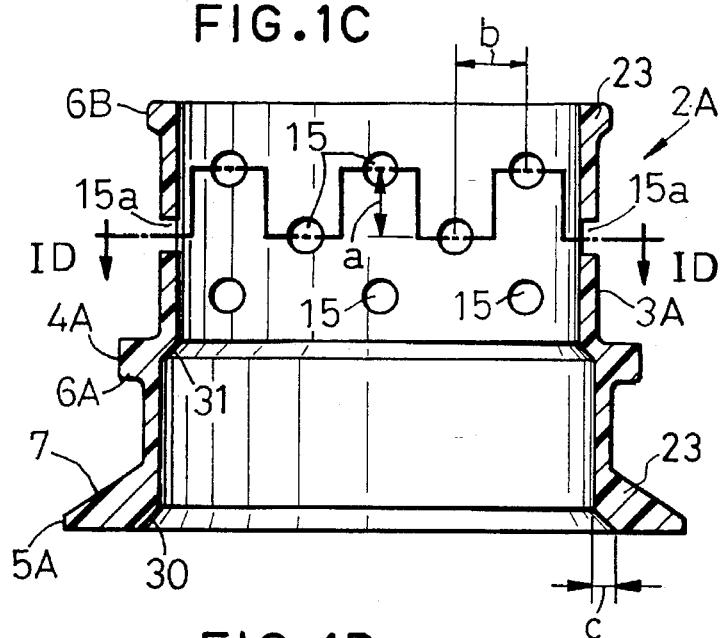
Figure 1D:
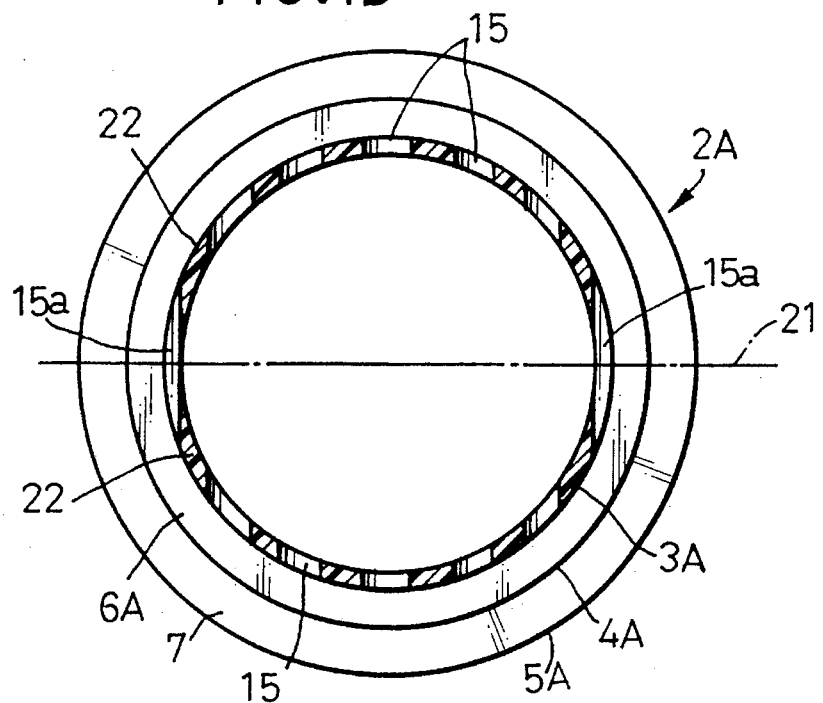
Figure 1E:
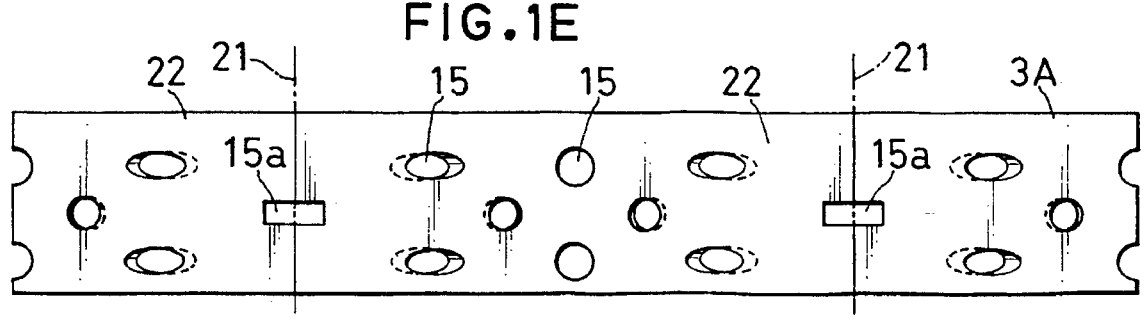

Referring to FIGS. 1D and 1C, the cylindrical body 3A is divided by a hypothetical partition 21 into two equal hypothetical half segments 22, 22. The through-holes 15, 15, . . . are formed in stagger in each of the hypothetical half segments 22, 22.

Referring to FIG. 1C, except for through-holes 15a, 15a at the hypothetical partition 21, the through-holes 15, 15, . . . in each half segment 22 are spaced apart substantially evenly in both vertical and circumferential directions. That is, the vertical distance "a" between any adjacent holes is virtually the same as the circumferential distance "b" between any adjacent holes. Further, all holes 15 have substantially the same diameter (for example, with a variation within 10 per cent). The arrangement of the holes 15a, 15, 15, . . . in the half segments 22, 22 are symmetrical with respect to the hypothetical partition 21.

Moreover, as shown in the drawings, the distance between the hole 15a at the partition and any adjacent hole 15 is almost equal to the distance between adjacent holes 15 in a half segment 22, and each hole 15a has almost the same open area as a hole 15. For present purposes, such minor differences in distance and in open area are ignored, and it is considered that any adjacent pair holes 15, 15a are spaced apart virtually equally from each other and that the open area of every hole 15 or 15a is considered to be substantially the same.

Thus, according to the first embodiment of the present invention, the arrangement and the total open areas of the through-holes 15a, 15, 15, . . . in one half segment 22 of the resin core member 2A are virtually the same as those in the other half segment 22. Therefore, bottle resin 23 is allowed to flow at a substantially uniform rate from inside to outside the cylindrical body 3A of the resin core member 2A.

The axes of all through-holes 15a, 15, 15, . . . in each half segment 22 are oriented parallel to a line connecting the arc center of the segment with the center of the resin core member 2A. In other words, the holes are oriented perpendicularly to the hypothetical partition 21 which corresponds to the parting line of a split mold (or in the open/close direction of the split mold), facilitating injection molding of the resin core member 2A.

According to the first embodiment, in addition to a flange 7 formed at the lower end of the cylindrical body 3A of the resin core member 2A, a radial outward projection 6A is formed immediately above the flange 7. A second radial outward projection 6B encircles the upper end of the cylindrical body 3A so that the resin core member 2A is held stably in the mold when a preform is molded.

Outer surface portions of the resin core member 3A between a peripheral end surface 4A of the projection 6A and a peripheral end surface 5A of the flange 7 and between a peripheral end surface 4B of the projection 6B and the top rim 4D of the cylindrical body 3A are exposed so as to be in contact with the neck mold when a preform is molded. The flange 7 constitutes a part of a support ring 8.

To save resin material used for forming the resin core member 2A, steps are formed in the inner wall of the cylindrical body 3A of the resin core member 2A to provide downward-facing edges 30 and 31.

For smooth flow of bottle resin 23 material, the downward-facing inside edges 30 and 31 of the cylindrical body 3A of the resin core member 2A are rounded to have a radius of 0.5 mm or more or cut off to be tapered so that the inside radius of the cylindrical body measured at the taper starting edge is 0.5 mm or more larger than that measured at the taper end edge (distance "c").

The resin thickness of inside layer 18 of the cylindrical body 3A of the resin core member 2A is set at 0.5 mm or larger for smooth flow of the resin.

Figure 2:
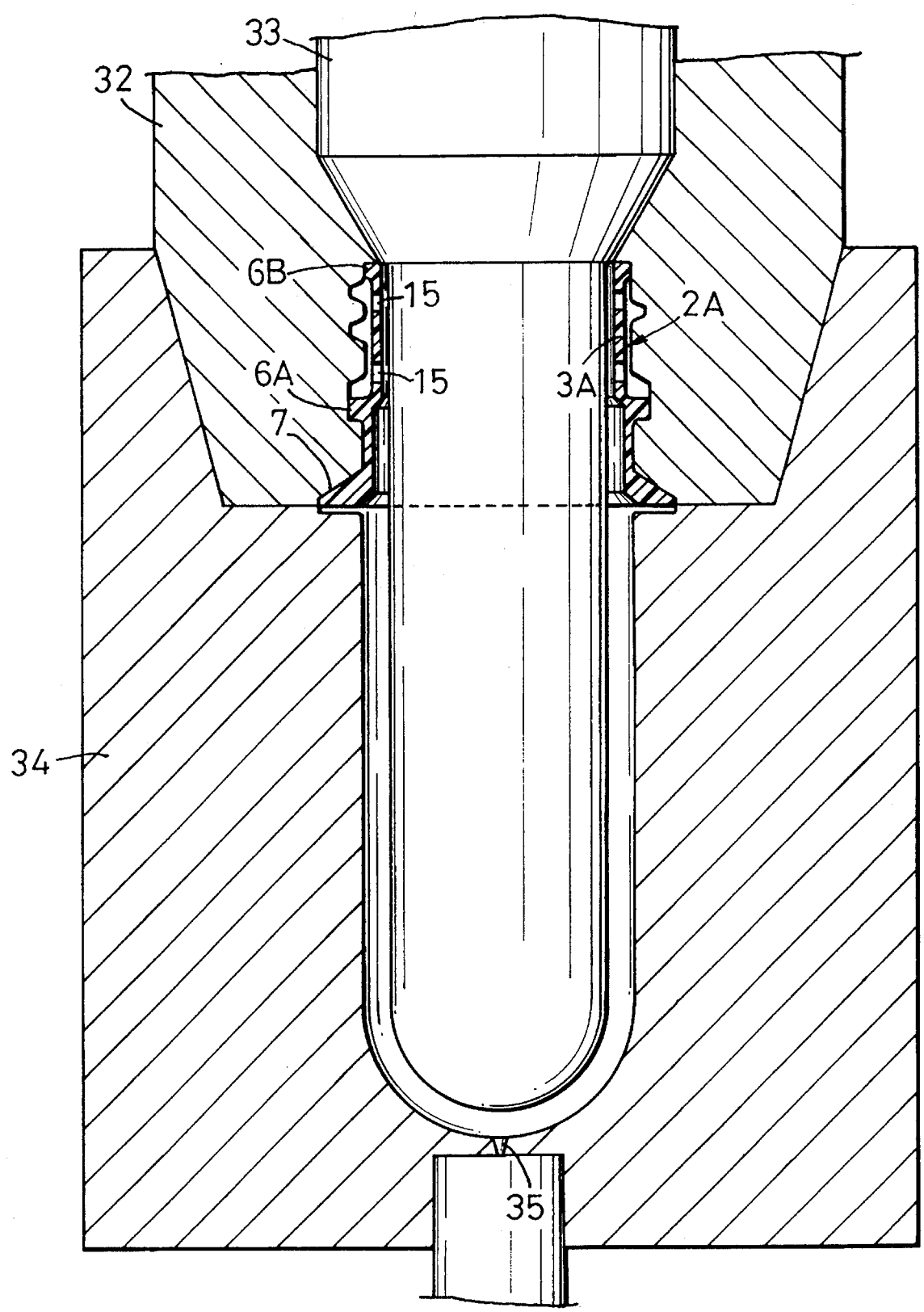
FIG. 2 is a drawing to which reference will be made in explaining the manufacturing method of a bottle preform having the bottle neck structure of the invention.
Figure 3A:
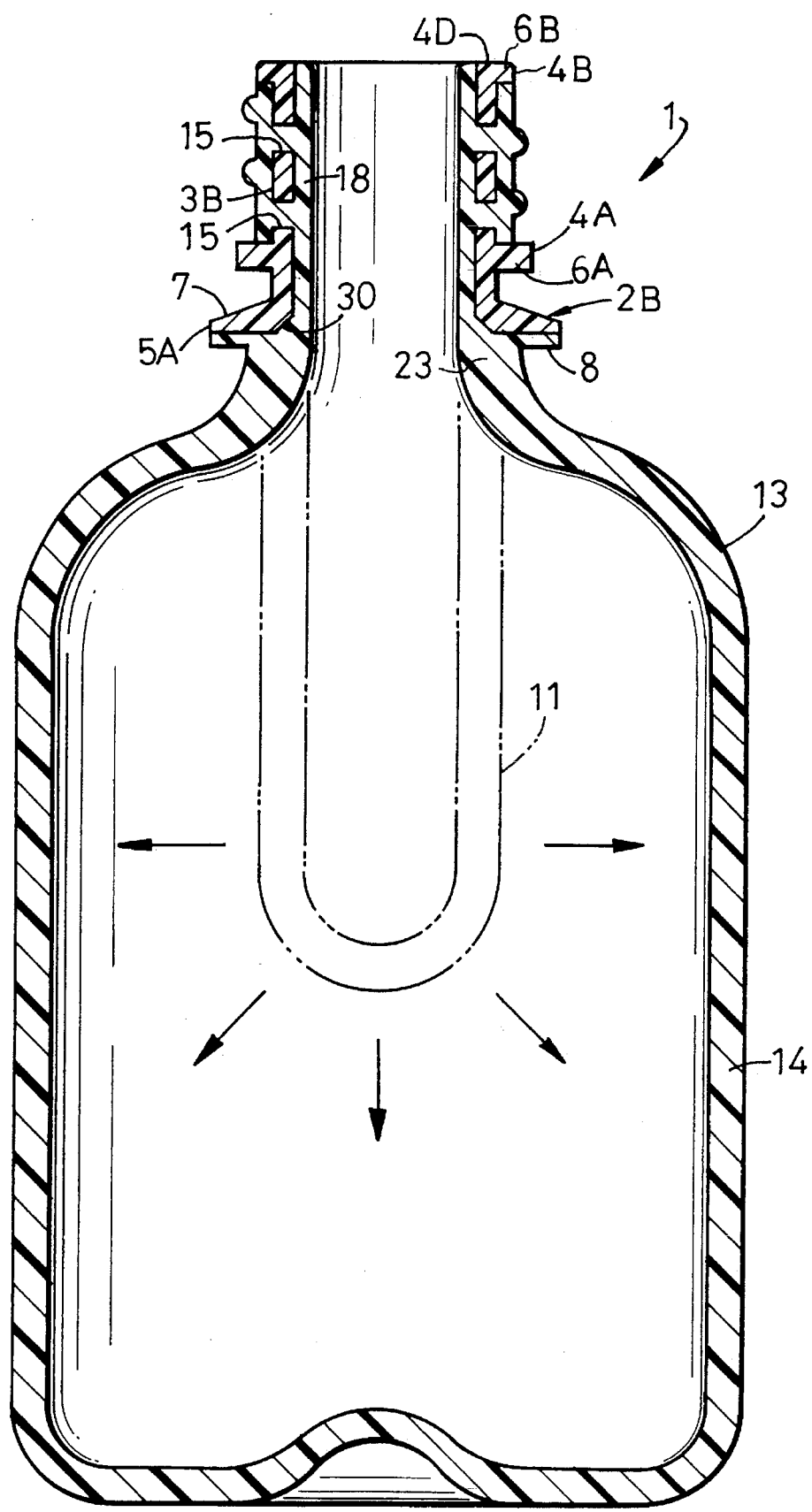
Figure 3B:
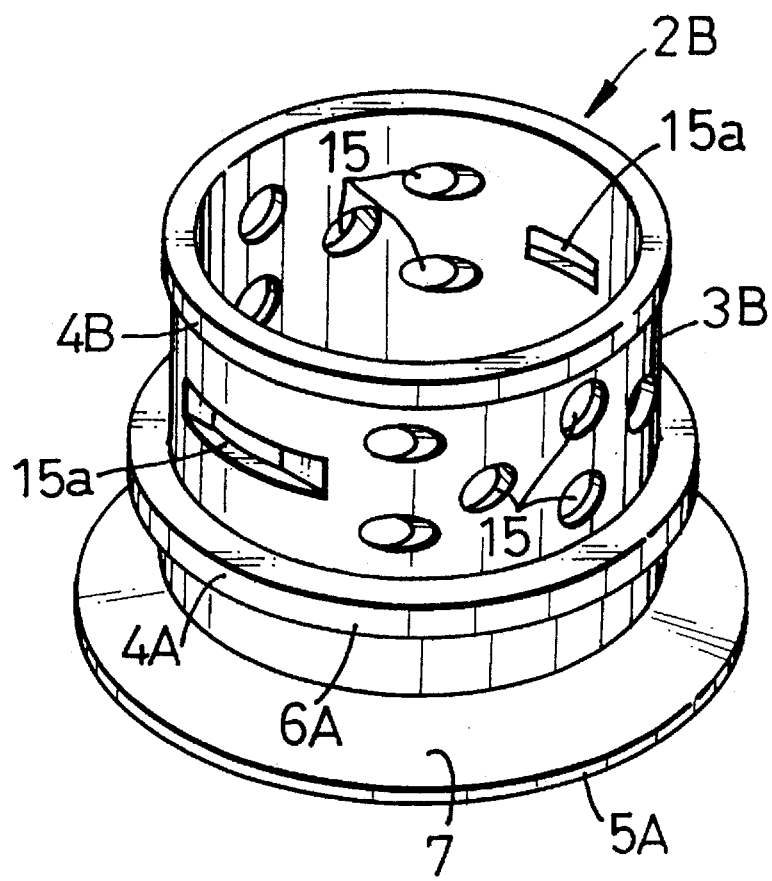

As shown in FIG. 2, the resin core member 2A is fit in a neck mold 32 in preparation for molding a preform 11. Portions of the projections 6A and 6B and of the flange 7 that will be exposed after the neck is formed are placed in contact with the surfaces of the neck mold 32. Then a core mold 33 and a cavity mold 34 are clamped in place. Bottle resin 23 material is injected through a gate 35 into a cavity to form a bottle drum body first. Bottle resin 23 material flows through the through-holes 15 and 15a from inside to outside the cylindrical body 3A of the resin core member 2A, thereby forming a bottle neck.

In the preferred embodiment, PET resin is used as bottle resin 23 material, and a thermally resistant resin such as "U Polymer" with higher thermal resistance than PET resin is used for the resin core member 2A.

Reversible or irreversible pigment and/or bacteriostat may be added in the resin material for the resin core member 2A.

The resin core member 2A may be colored, carved or provided with surface-printing.

The preform 11 thus manufactured is blown into a biaxially stretched bottle 13. The bottle drum body 14 is normally heat set.

FIGS. 3A through 3E show a bottle neck structure 1 of a second embodiment of the present invention. The second embodiment is completely the same as the first embodiment, except that the inside surface of the cylindrical body 3B is not stepped so that it has no upper downward-facing edge 31.

Figure 4A:
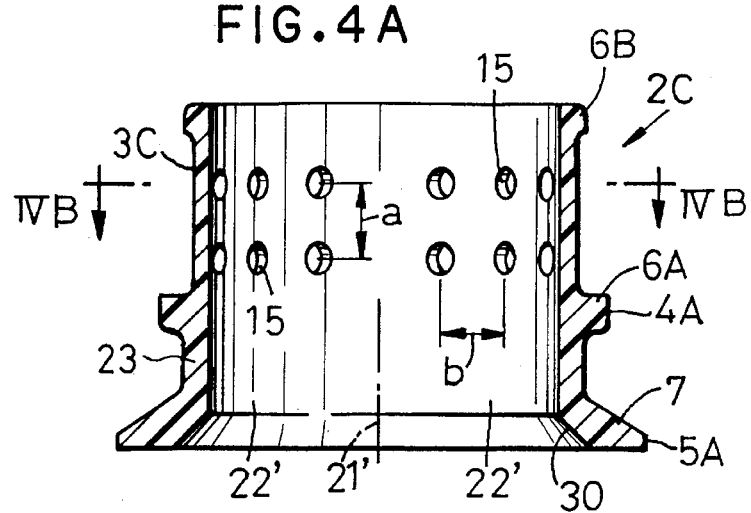
FIGS. 4A through 4C show the resin core member of a bottle neck structure according to a third embodiment of the invention.
Figure 4B:
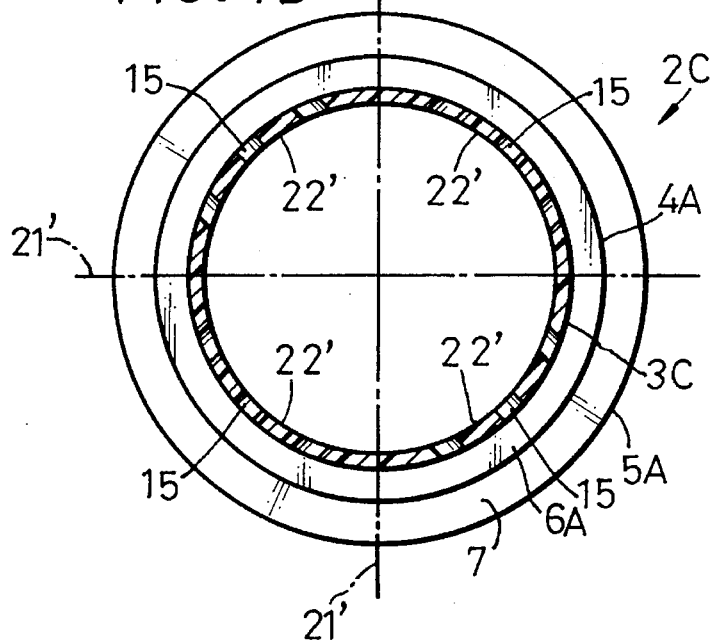
Figure 4C:
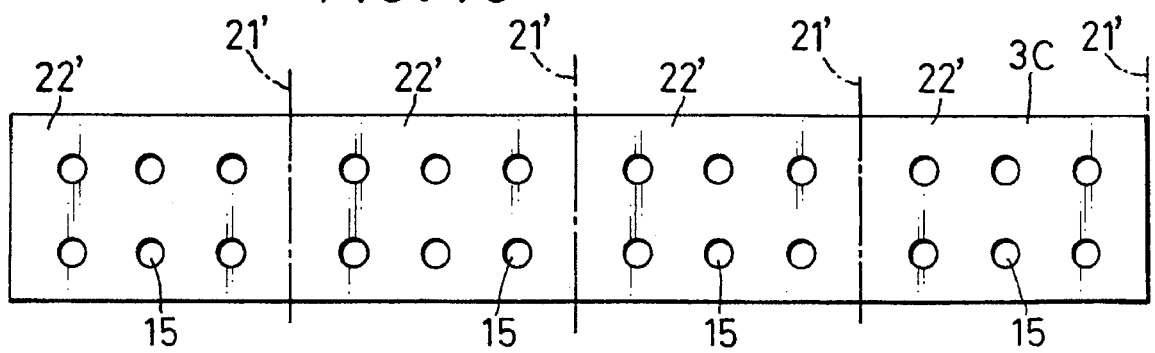

FIGS. 4A through 4C show the resin core member 2C of the bottle neck according to a third embodiment of the present invention. The resin core member 2C of this embodiment has the same configuration as that of the first embodiment except for the arrangement and orientation of the through-holes 15. The resin core member 2C of this embodiment has no edge 31.

According to the third embodiment, the resin core member 2C is formed in a quarter-split mold. The hypothetical partitions 21', 21' correspond to the parting lines of the split mold. Through-holes 15, 15, . . . are formed in the orientation along the open/close direction of each hypothetical quarter segment of the mold, that is, in parallel with the line connecting the arc center of each quarter segment 22' with the center of the resin core member 2C.

In each hypothetical quarter segment 22', the through-holes 15, 15, . . . are arranged in a matrix, spaced apart substantially uniformly from the vertical and circumferential adjacent holes. As shown, no through-holes 15 are formed at the hypothetical partitions 21',21'. However, the distance between adjacent through holes 15, across each partition 21', in adjacent segments 22 is almost equal to the distance between adjacent holes 15 in a segment 22'. Here, such minor difference in the distance is ignored, and it is considered that any adjacent holes 15 are spaced apart equally from each other.

Figure 5A:
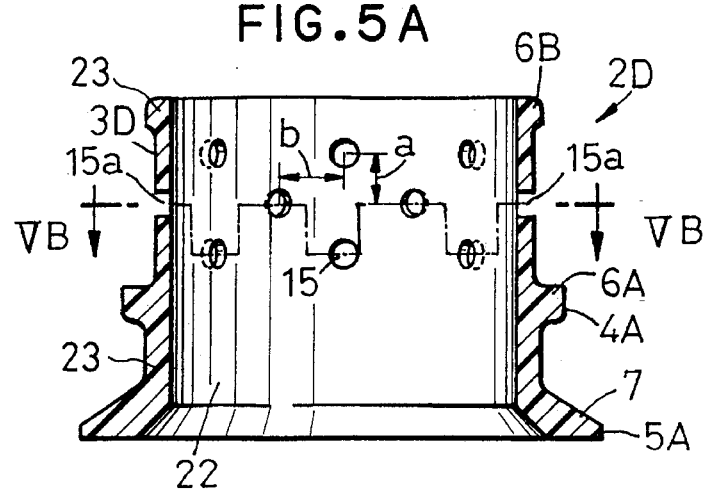
FIGS. 5A through 5C shows the resin core member of a bottle neck structure according to a fourth embodiment of the invention.
Figure 5B:
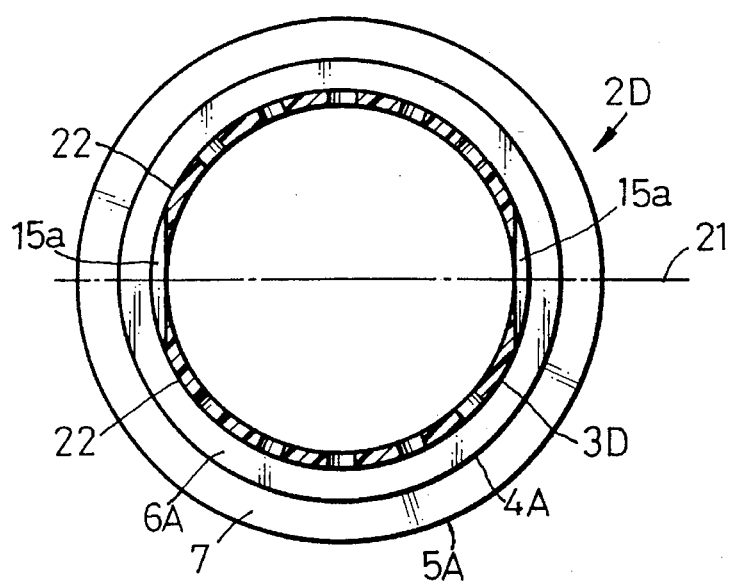
Figure 5C:
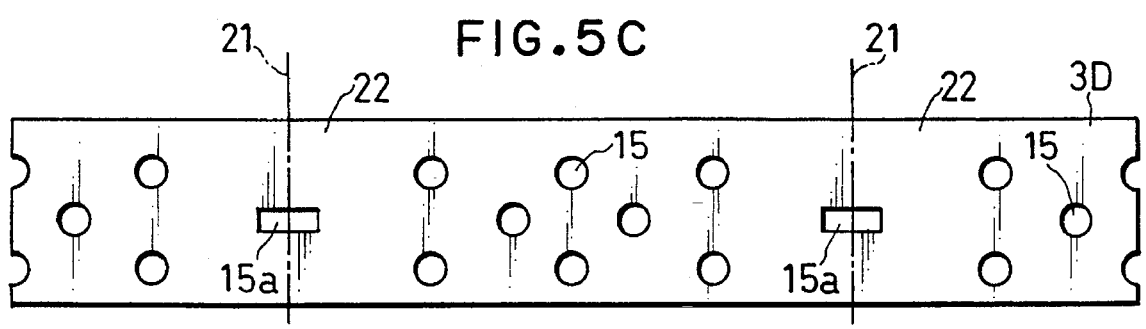

FIGS. 5A through 5C shows a resin core member 2D of a bottle neck according to a fourth embodiment of the invention. The resin core member 2D of this embodiment has also the same configuration as the resin core member 2D of the first embodiment except for the arrangement and orientation of through-holes. The resin core member 2D of this embodiment has also no edge 31.

The resin core member 2D of this embodiment is formed in a split mold. Excepting the through-holes 15a at the hypothetical partition 21, the through-holes 15, 15, . . . are formed in stagger in each of the hypothetical half segments, and are spaced apart almost equally in both vertical and circumferential directions. Each through-hole 15 has substantially the same diameter. Further, excepting the holes 15a at the hypothetical partition 21, the holes 15, 15, . . . are oriented to the center of the resin core member 2D.

Like those of the first embodiment, the through-holes 15a at the hypothetical partition are formed perpendicularly to hypothetical partition 21, making it easy to open the split mold after the resin core member 2D has been molded. The distance between a through hole 15a at the hypothetical partition 21 and an adjacent through-hole 15 is different from that between any adjacent holes 15 in a half segment 22. The open area of each hole 15a is a little different from that of each hole 15. However, such minor difference in the distance and in the open area is ignored, and it is considered that any adjacent holes 15, 15a are spaced apart virtually equally from each other and the open area of each hole 15 or 15a is considered to be virtually the same. The through-holes 15a at the hypothetical partition 21 is not necessarily formed.

Figure 6A:
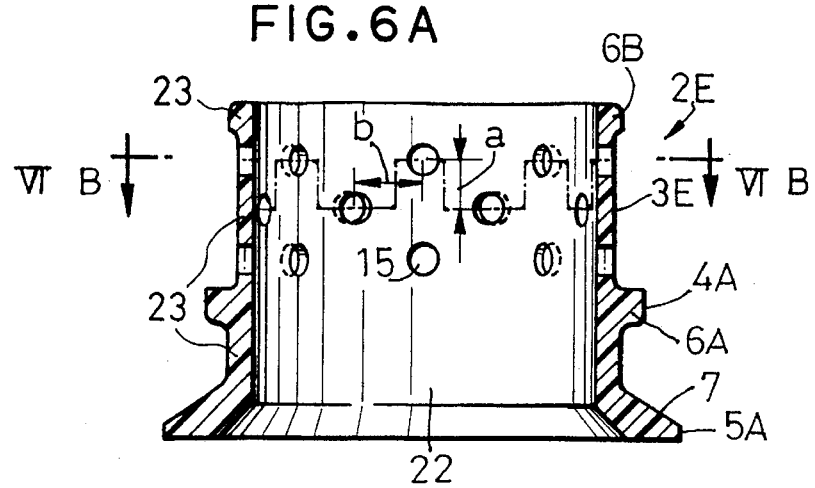
FIGS. 6A through 6C shows the resin core member of a bottle neck structure according to fifth embodiment of the invention.
Figure 6B:
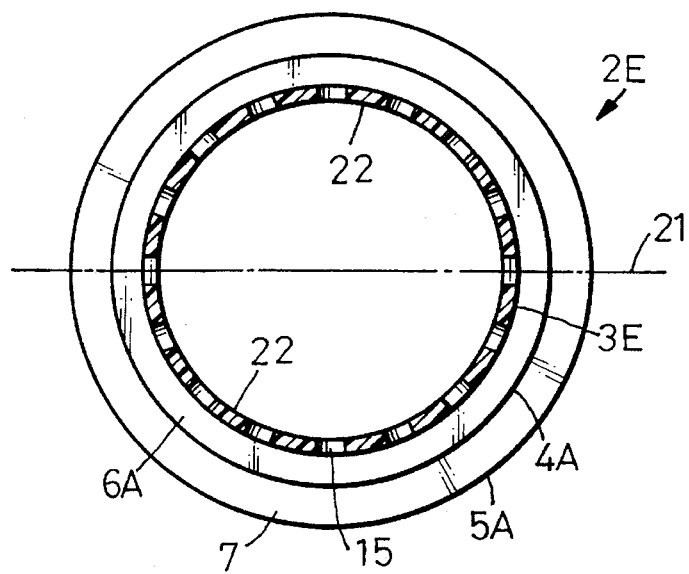
Figure 6C:
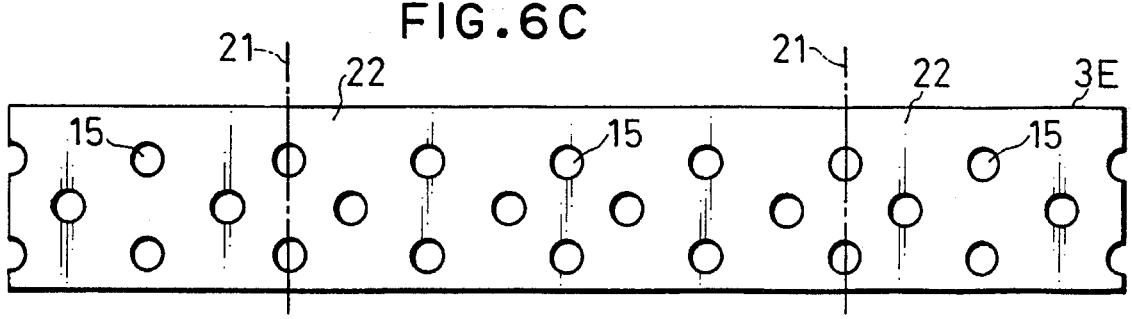

FIGS. 6A through 6C show a resin core member 2E of a bottle neck according to a fifth embodiment of the invention. The resin core member 2E of this embodiment has also the same configuration as the resin core member 2E of the first embodiment except for the arrangement and orientation of through-holes. The resin core member 2E of this embodiment has also no edge 31.

In this embodiment, the through-holes 15,15, . . . are spaced apart virtually equally over the entire circumference of the cylindrical body 3E and have substantially the same diameter. Every hole 15 is oriented to the center of the resin core member 2E.

The resin core member 2E of the fifth embodiment is ideal in that it permits bottle resin 23 to flow from inside to outside the resin core member 2E at a uniform rate. With this configuration of the resin core member 2E, however, it is impossible to open the split mold after the resin core member 2E has been formed, if the split mold is of an ordinary type. Through-holes must be drilled after a resin core member 2E has been formed. Otherwise, it is necessary to use such a complicated split mold or core mold that has through-hole forming pins which are slidably retracted within the split mold, or the core mold, before the formed resin core member 2E is taken out of the mold.

Figure 7:
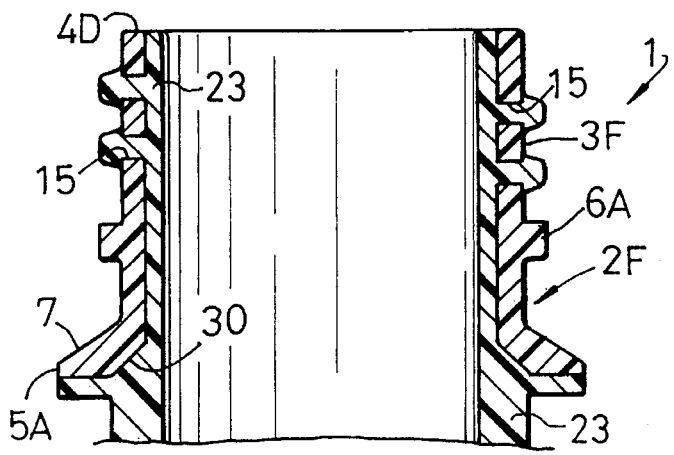
FIGS. 7 through 9 are sectional views bottle neck structures according to the sixth through eighth embodiments, respectively, of the invention.

FIG. 7 shows a bottle neck structure 1 of a sixth embodiment of the invention. In the resin core member 2F forming this bottle neck structure 1, the outer surface of the cylindrical body 3F from the top rim 4D to the peripheral end surface 5A of the flange 7, excepting the threads 21A, serves as a contact surface with the neck mold, that is, to be exposed even after the bottle neck has been formed. Therefore, the threads 21A are the only bottle resin 23 material on the outer surface of the resin core member 2F. The threads 21A are formed of bottle resin material allowed to flow through the through-holes 15 from inside to the outside the cylindrical body 3F.

The other features of the resin core member 2F of this embodiment is the same as that of the first embodiment excepting that a downward-facing edge 31 is not formed on the inner surface of the cylindrical body 3F, and that the cylindrical body 3F has no radial outward projection 6B at the upper end thereof.

Figure 8:
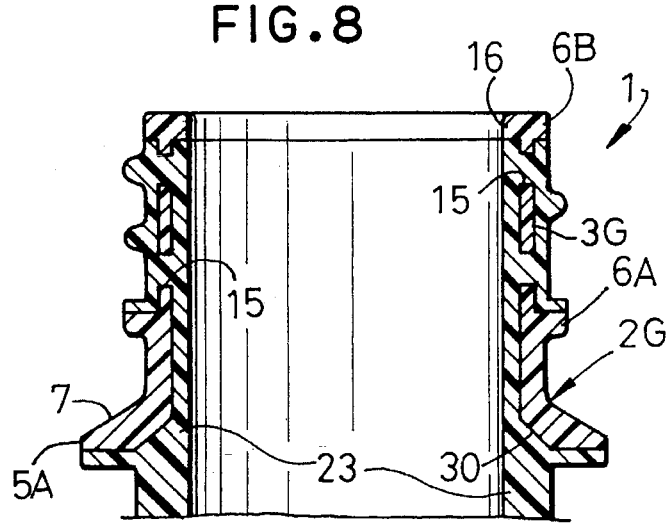
Figure 9:
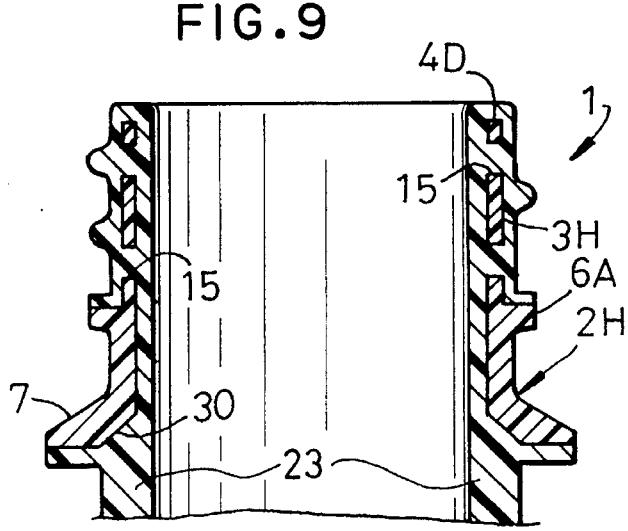

FIGS. 8 and 9 show a bottle neck structure 1 of seventh and eighth embodiments, respectively, of the present invention. According to the seventh embodiment, in addition to a radial outward projection 6B, an inward projection 16 is formed at the upper end of the cylindrical body 3G. Therefore, only the resin material of the resin core member 2G is exposed on the bottle neck top surface. In contrast, according to the eighth embodiment, the top rim 4D of the cylindrical body 3H of the resin core member 2H is completely covered with bottle resin 23 material. Therefore, the bottle resin 23 material alone is exposed on the bottle neck top surface.

Figure 10:
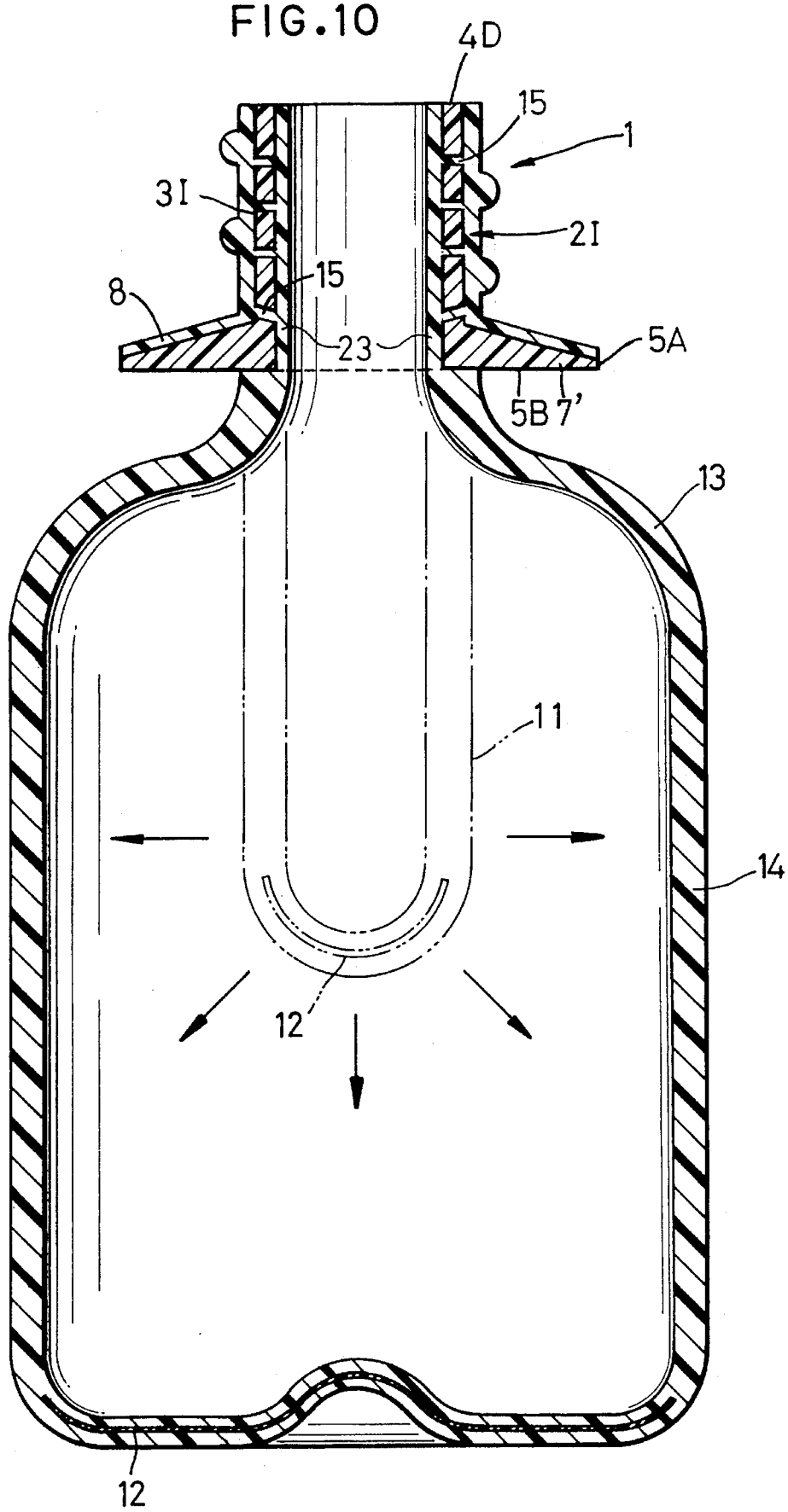
FIG. 10 is a sectional view of a bottle having a bottle neck structure according to a ninth embodiment of the invention.

FIG. 10 shows a bottle having the neck structure 1 of a ninth embodiment of the present invention. Unlike that of the first embodiment, resin core member 2I of this neck structure has no radial outward projection 6B, 6A at the upper end of the cylindrical body. The flange 7' at the lower end of the resin core member 2I constitutes the base of a support ring 8. Therefore, when the bottle neck 1 of this embodiment is molded, the top rim 4D of the cylindrical body 3I, and the peripheral end surface 5A and lower surface 5B of the flange 7' are made in contact with the neck mold, that is, exposed to the exterior even after the bottle neck has been formed. The bottom of the bottle is multiple-layered with a thermally resistant resin layer 12. The bottle drum body is heat-set.

Figure 11A:
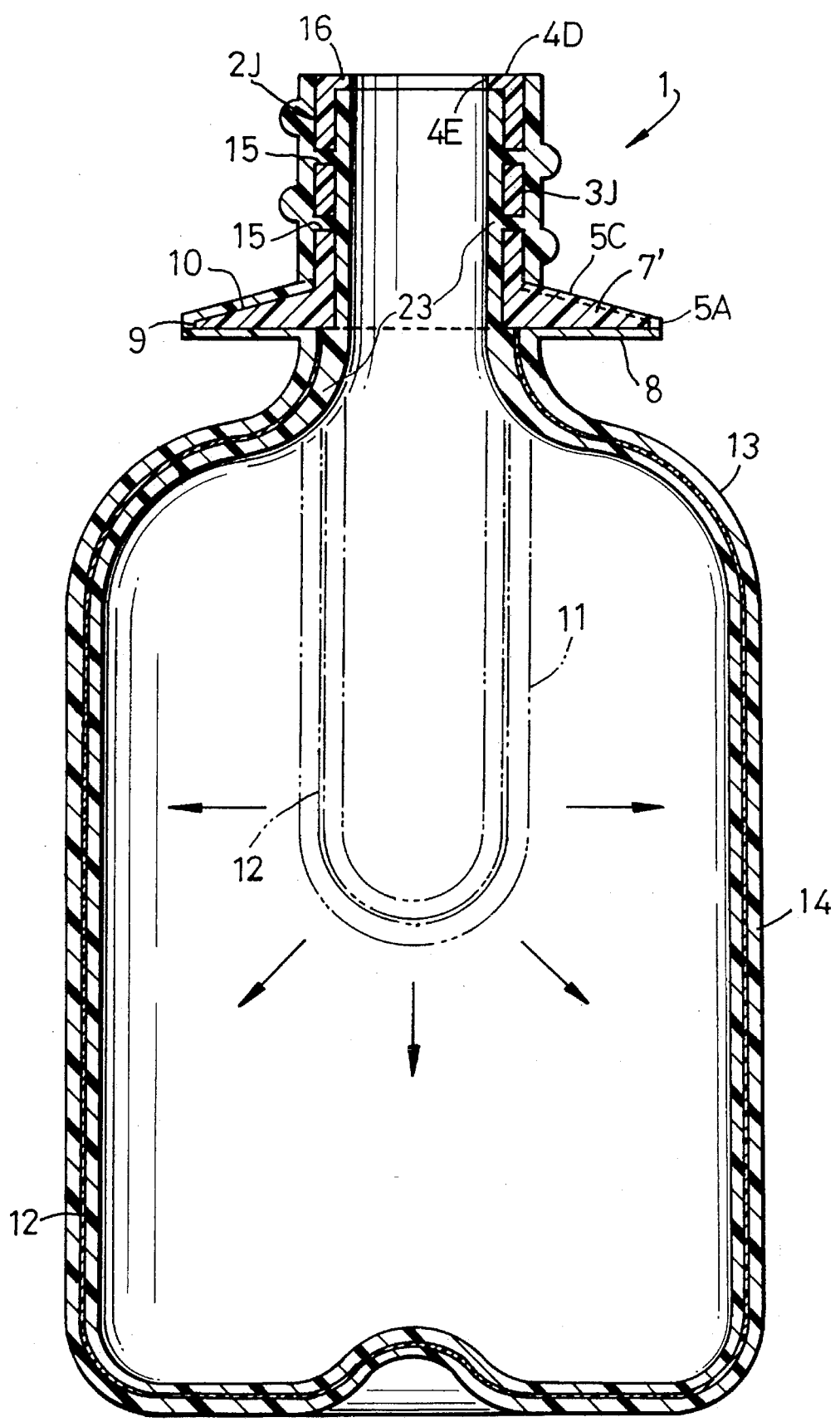
FIGS. 11A and 11B show a bottle neck structure according to a tenth embodiment of the invention.
Figure 11B:
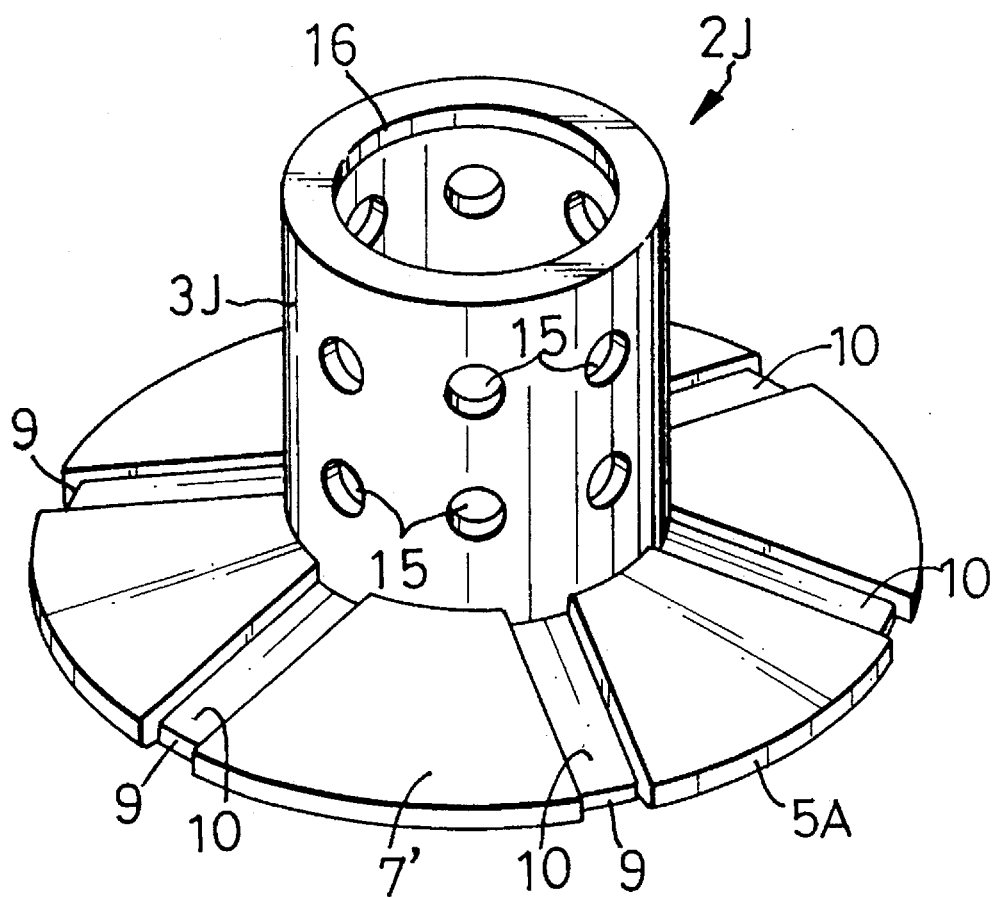

FIGS. 11A and 11B show a bottle neck structure 1 of a tenth embodiment of the present invention. According to this embodiment, a radial inward projection 16 is formed at the upper end of the cylindrical body 3J of the resin core member 2J. The surface from the top rim 4D of the cylindrical body 3J to the inner peripheral end surface 4E and the surface of the flange 7' at the lower end of the cylindrical body 3J are in contact with a neck mold and a core mold. According to this embodiment, in addition to the through-holes 15 in the cylindrical body 3J, notches 9 and grooves 10 are formed in the flange 7' for passage of bottle resin 23 material. Therefore, the surface portion of the flange 7' to be in contact with a neck mold is the peripheral end surface 5A excepting the notches 9 and a substantial portion of the upper surface 5C excepting the grooves 10.

The drum body and bottom of the bottle of this embodiment are multiple-layered with thermally resistant and/or gas barrier resin layer 12.

Figure 12A:
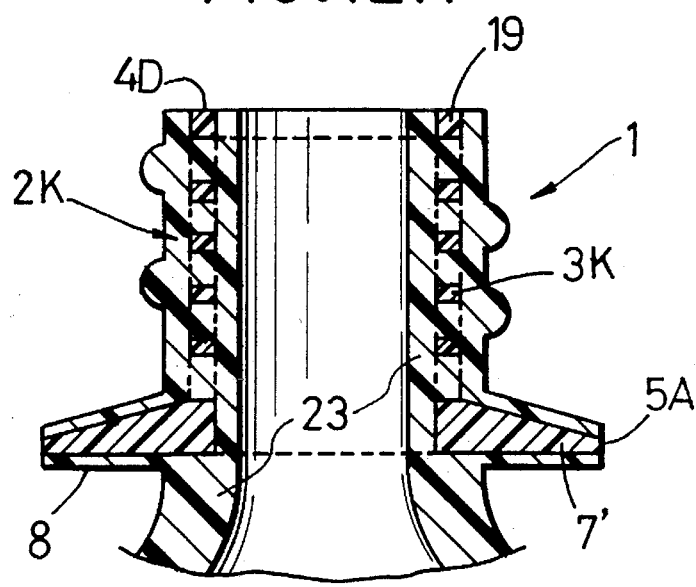
FIGS. 12A and 12B show a bottle neck structure according to a eleventh embodiment of the invention.
Figure 12B:
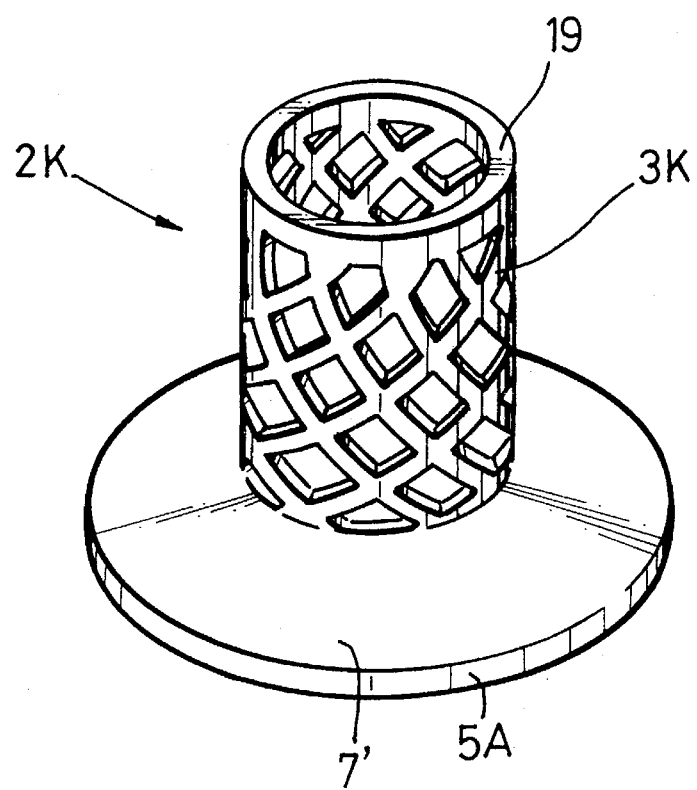

FIGS. 12A and 12B show a bottle neck structure 1 of a eleventh embodiment of the present invention. According to this embodiment, the cylindrical body 3K of the resin core member 2K is of a mesh with a ring 19 on the upper end and with a flange 7' on the lower end. The peripheral end surface 5A of the flange 7' and the top end surface 4D of the ring 19 are made in contact with a neck mold, that is, exposed to the exterior when the neck has been formed.

Figure 13A:
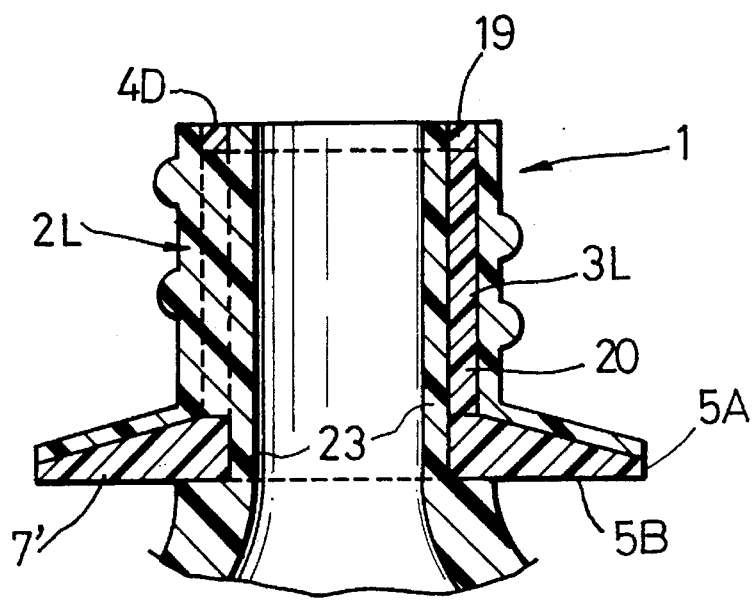
Figure 13B:
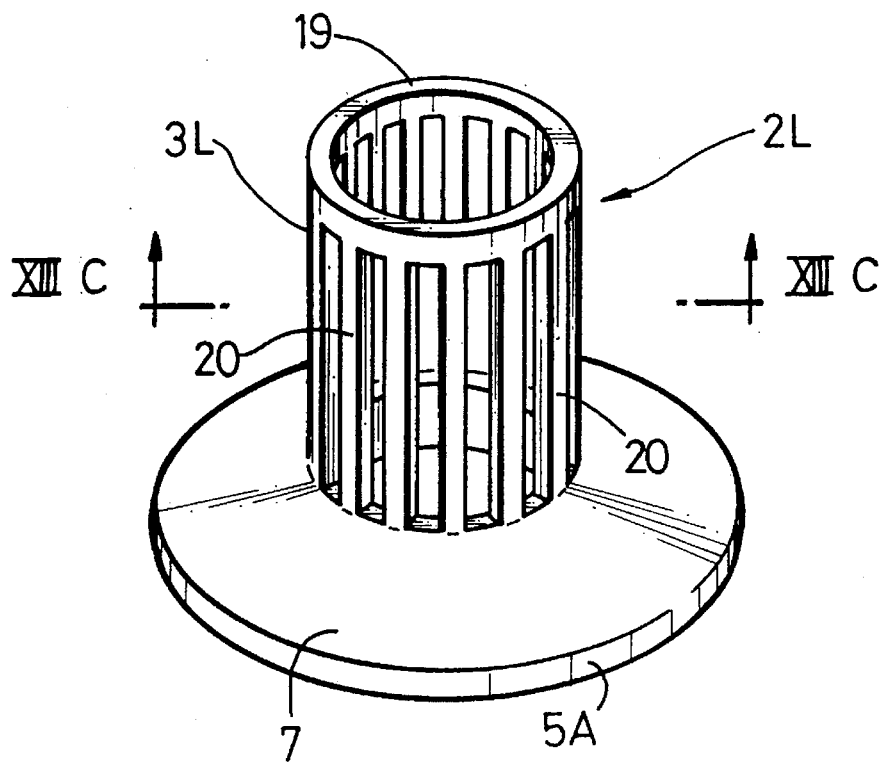

FIGS. 13A, 13B and 13C show a bottle neck structure 1 of a twelfth embodiment of the invention. The cylindrical body 3L of the resin core member 2L comprises a plurality of columns 20 (column train) arranged to form a cylinder. A ring 19 and a flange are provided on the upper and lower ends, respectively, of the columns 20. The top end surface 4D of the ring 19 and the peripheral end surface 5A and lower surface 5B of the flange 7' are made in contact with a neck mold, or exposed to the exterior when the bottle neck has been molded.

FIGS. 14A and 14B show a bottle neck structure 1 of a thirteenth embodiment of the invention. A spiral projection 17 is formed on the outer circumferential surface of the cylindrical body 3M of the resin core member 2M. The ridge of the spiral projection 17 and the outer end surface 5A of the flange 7' are exposed to the exterior when the bottle neck has been molded.

What is claimed is:

1. A bottle neck structure of a synthetic resin bottle comprising:

a resin core member;

said resin core member having a cylindrical body;

said cylindrical body having through-holes therein;

a bottle resin layer covering substantially all of an inside surface of said resin core member;

said bottle resin layer passing through said through-holes and covering a portion of an outside surface of said resin core member; and said portion of an outside surface having an outside shape adapted for affixing a cap thereto;

said cylindrical body having a circumferential wall;

a flange constituting a support ring of the bottle neck structure comprising at least one exposed surface portion of said outside surface to be in contact with a preform mold when a bottle preform is molded; and said through-holes being formed in said circumferential wall of said cylindrical body.

2. The bottle neck structure according to claim 1 further comprising:

said cylindrical body being a tube type;

said through-holes in said circumferential wall of said cylindrical body being at least 1 mm in diameter;

said bottle resin layer being at least 0.5 mm in thickness; and at least one tapered downward-facing inside edge of said resin core member.

3. The bottle neck structure according to claim 1, wherein:

said cylindrical body of said resin core member is divided by a hypothetical partition along a longitudinal plane bisecting said resin core member into equal hypothetical segments; and a total open area of said through-holes in one said hypothetical segment is substantially equal to said total open area in a hypothetical segment located opposite said one said hypothetical segment across said longitudinal bisecting plane.

4. The bottle neck structure according to claim 3, wherein an arrangement of said through-holes in each of said hypothetical segments is symmetrical with respect to said hypothetical partition.

5. The bottle neck structure according to claim 3, wherein an axis of each said through-hole is parallel with a line, said line bisecting an arc created by each of said hypothetical segments and intersecting a center of said resin core member.

6. The bottle neck structure according to claim 1, wherein said through-holes are spaced apart substantially uniformly in both vertical and circumferential directions.

7. The bottle neck structure according to claim 1, further comprising:

an outward projection formed around said outside surface of said cylindrical body below said covered portion of said resin core member; and said outward projection providing an exposed surface to be in contact with a preform mold when a preform is molded.

8. The bottle neck structure according to claim 1 wherein, said resin core member is composed of a thermally resistant resin.

9. The bottle neck structure according to claim 1, wherein said resin core member contains a reversible pigment.

10. The bottle neck structure according to claim 1, wherein said resin core member is colored.

11. A bottle, having the bottle neck structure according to claim 1, further comprising a drum body formed of said bottle resin, said drum body being heat set.

12. The bottle neck structure according to claim 1, wherein said resin core member contains an irreversible pigment.

13. The bottle neck structure according to claim 1, wherein said resin core member contains a bacteriostat.

14. The bottle neck structure according to claim 1, wherein said resin core member is carved.

15. The bottle neck structure according to claim 1, wherein said resin core member is printed thereon.

16. The bottle neck structure according to claim 1, further comprising a drum body, said drum body being multiple layered.

17. The bottle neck structure according to claim 1, wherein:

said resin core member is devisable into hypothetical segments; and an axis of each said through-hole is parallel with a line, said line bisecting an arc created by each of said hypothetical segments and intersecting a center of said resin core member.

18. A bottle, having a bottle neck structure, comprising:

a resin core member:

said resin core member having a cylindrical body;

said cylindrical body having through-holes therein;

a bottle resin layer covering substantially all of an inside surface of said resin core member;

said bottle resin layer passing through said through-holes and covering a portion of an outside surface of said resin core member;

said portion of an outside surface having an outside shape adapted for affixing a cap thereto;

said resin core member divisable into hypothetical segments; and an axis of each said through-hole is parallel with a line, said line bisecting an arc created by each of said hypothetical segments and intersecting a center of said resin core member.

19. The bottle neck structure of claim 18 further comprising:

a remainder of an outside of said resin core member; and said remainder being free of said bottle resin whereby a clamping surface is provided for clamping by a neck mold.

20. The bottle neck structure of claim 18 further comprising means for mechanically strengthening said resin core member so that said cap may be affixed to said bottle when said bottle is filled with a hot liquid.

21. The bottle neck structure of claim 20 wherein said means for mechanically strengthening includes a flange.

22. The bottle neck structure according to claim 18, wherein said resin core member is a thermally resistant resin.

23. A bottle neck structure of a synthetic resin bottle comprising:

a preformed resin core member made of a thermally resistant resin;

said preformed resin core member includes a cylindrical body making a core wall of said bottle neck structure;

a flange radially projected from an outside surface at a lower end of said cylindrical body;

a projection radially extended from said outside surface of said cylindrical body above said flange;

an inner bottle resin layer formed of a bottle resin on said inside surface of said cylindrical body;

a plurality of through-holes formed above said projection in said cylindrical body;

an outer bottle resin layer formed on said outside surface above said projection;

said outer bottle resin layer contiguous through said through holes with said inner bottle resin layer whereby said cylindrical body is substantially embedded in said bottle resin;

said outer bottle resin layer forming a region for affixing a cap;

an outer surface portion of said cylindrical body between said flange and said projection being an exposed surface free of bottle resin; and said through-holes having sizes and locations for permitting bottle resin to pass uniformly from said inside surface of said cylindrical body to said outside surface of said cylindrical body through said through-holes.

24. A bottle with a bottle neck structure comprising:

a resin core member having a cylindrical body;

said cylindrical body having a circumferential wall;

said cylindrical body being a tube;

a flange constituting a support ring on said bottle neck structure, said flange having at least one exposed surface portion of an outside surface adapted to be contacted by a mold;

a plurality of through-holes in said circumferential wall of said cylindrical body being at least 1 mm in diameter;

an inner bottle resin layer on an inside surface of said resin core member;

said inner bottle resin layer being at least 0.5 mm in thickness;

said resin core member having a downward-facing inside edge, said downward-facing inside edge having one of an edge radius and a taper;

an outer resin layer created by bottle resin passing through said through-holes;

said outer resin layer including a covered portion of said cylindrical body;

a drum body of said bottle resin; and said drum body being contiguous with at least one of said inner bottle resin layer and said outer resin layer.

25. The bottle neck structure according to claim 24, further comprising:

said edge radius being at least 0.5 mm;

said taper bounded by first and second inside radii of said cylindrical body with said first inside radius being at least 0.5 mm larger than said second inside radius;

said cylindrical body of said resin core member being divisible by a hypothetical partition into equal hypothetical segments, whereby a total open area of said through-holes in one said hypothetical segment is substantially equal to said total open area in any other said hypothetical segment;

an arrangement of said through-holes in each of said hypothetical segments being symmetrical with respect to said hypothetical partition;

said through-holes being substantially uniform in both vertical and circumferential spacing;

each through-hole having an axis and substantially equivalent diameters;

said axis of each said through-hole is parallel with a line bisecting an arc created by each of said hypothetical segments and intersecting a center of said resin core member.

26. The bottle neck structure according to claim 24, wherein said drum body is heat-set.

27. The bottle neck structure according to claim 24 wherein said resin core member is composed of a thermally resistant resin.

* * * * *